(12) United States Patent
Kioka et al.

(10) Patent No.: US 6,235,854 B1
(45) Date of Patent: *May 22, 2001

(54) SOLID TITANIUM CATALYST COMPONENT AND ITS USE IN OLEFIN POLYMERIZATION CATALYST

(75) Inventors: Mamoru Kioka; Shinichi Kojo; Tsuneo Yashiki, all of Yamaguchi (JP)

(73) Assignee: Mitsui Chemicals, Inc., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/849,315

(22) PCT Filed: Oct. 9, 1996

(86) PCT No.: PCT/JP96/02947

§ 371 Date: Jun. 10, 1997

§ 102(e) Date: Jun. 10, 1997

(87) PCT Pub. No.: WO97/13794

PCT Pub. Date: Apr. 17, 1997

(30) Foreign Application Priority Data

Oct. 11, 1995 (JP) .................................... 7-263237

(51) Int. Cl.[7] .............................. C08F 4/658; C08F 10/00

(52) U.S. Cl. .................. 526/119; 526/124.9; 526/125.3; 526/128; 526/904; 502/104; 502/108; 502/111; 502/116; 502/117; 502/127

(58) Field of Search .................................... 502/104, 108, 502/111, 116, 117, 127; 526/119, 124.9, 125.3, 128, 904

(56) References Cited

U.S. PATENT DOCUMENTS

| 4,829,038 | * | 5/1989 | Hoppin et al. ........................ 502/125 |
| 4,952,649 | * | 8/1990 | Kiola et al. ............................ 526/125 |
| 5,292,837 |   | 3/1994 | Heinrich et al. . |

FOREIGN PATENT DOCUMENTS

| 58-83006A  | 5/1983  | (JP) . |
| 3-2733010  | 12/1991 | (JP) . |
| 5-70517    | 3/1993  | (JP) . |
| 5-194647   | 8/1993  | (JP) . |

* cited by examiner

Primary Examiner—Donald R. Wilson
(74) Attorney, Agent, or Firm—Birch, Stewart, Kolasch & Birch, LLP

(57) ABSTRACT

The invention provides a process for preparing a solid titanium catalyst component for use in the preparation of an olefin polymerization catalyst, which comprises:

(1) a step wherein a suspension is prepared which contains a solid material prepared by contacting a magnesium compound with a first titanium compound and having a polybasic carboxylic acid ester supported thereon;

(2) a step wherein the solid material is separated from the suspension; and (3) a step wherein the solid material is contacted with a second titanium compound under heating;

wherein while the solid material is separated from the suspension in the step (2) and the solid material is supplied to the step (3), the solid material is maintained at a temperature in the range of 70–130° C.

14 Claims, 1 Drawing Sheet

SOLID TITANIUM CATALYST COMPONENT AND ITS USE IN OLEFIN POLYMERIZATION CATALYST

BACKGROUND OF THE INVENTION

1. Field of the Invention

This invention relates to a solid titanium catalyst component and an olefin polymerization catalyst prepared from the same. More particularly, the invention relates to a process for preparing a solid titanium catalyst component, such a catalyst component as prepared by the process, a preliminary olefin polymerization catalyst and an olefin polymerization catalyst both prepared from such a catalyst component, and a process for producing polyolefins using such catalysts.

2. Description of the Prior Art

A Ziegler-Natta catalyst comprising a titanium catalyst component and an organoaluminum compound have been in wide use as an olefin polymerization catalyst. It is already known that a catalyst which is prepared from a solid titanium catalyst component comprising a titanium compound supported on a solid carrier has high polymerization activity. In particular, it is also known that a catalyst which is prepared from a solid titanium catalyst component comprising a titanium compound supported on a solid halogenated magnesium compound has high polymerization activity, but also the catalyst provides highly stereospecific polyolefins in high yields when it is used for the polymerization of alpha-olefins having at least three carbon atoms such as propylene or 1-butene.

The solid titanium catalyst component comprising a titanium compound supported on a solid halogenated magnesium compound may be prepared by contacting a halogenated magnesium compound, a titanium compound and an electron donor with each other.

A process for an olefin polymerization using such a solid titanium catalyst component is known, as disclosed in Japanese Patent Application Laid-open No. 58-83006. According to the prior art, a solid titanium catalyst component is prepared by use of a hydrocarbon solution of a magnesium compound, a titanium compound which is per se liquid such as titanium tetrachloride and an electron donor. An olefin polymerization catalyst is then prepared from the solid titanium catalyst component, an organometallic catalyst component and an organosilicone catalyst component. The prior art uses a certain compound such as an acid anhydride in combination with a polybasic carboxylic acid ester or a polyhydric alcohol ester as an electron donor when the solid titanium catalyst component is prepared.

The hydrocarbon solution of a magnesium compound is prepared usually by solubilizing a magnesium compound which is solid at normal temperatures such as magnesium chloride with a solubilizing agent, if necessary, in a hydrocarbon solvent. A preferred example of the solubilizing agent is an alcohol such as 2-ethylhexanol.

More specifically, according to the prior art, the solid titanium catalyst component is prepared by first contacting a solution of a magnesium compound with titanium tetrachloride in the presence of an electron donor to form a suspension which contains the resultant solid material; the solid material is separated from the suspension; and then the solid material is again contacted with titanium tetrachloride under heating.

As mentioned above, the polymerization of olefins in the presence of a catalyst prepared from the solid titanium catalyst component together with an organometallic catalyst component and an organosilicone catalyst component provides polyolefins in high yields. In particular, the polymerization of alpha-olefins having at least three carbon atoms provides highly stereospecific polyolefins in high yields. In addition, the resulting polyoefins have a small content of finely divided polymer powder as well as narrow particle distribution and high bulk density.

The known olefin polymerization catalyst which is prepared by a method as described above and contains the solid titanium catalyst component has a high performance in many respects, that is, in respect of polymerization activity, and stereospecificity and particle properties of the resulting polymers, as above set forth. However, in recent years, there is a strong demand for a solid titanium catalyst component for use in the preparation of an olefin polymerization catalyst which reduces the amount of finely divided polymer powder produced.

Therefore, it is an object of the invention to provide a solid titanium catalyst component for use in an olefin polymerization catalyst which has high olefin polymerization activity, and in particular, for use in an alpha-olefin polymerization catalyst which provides polyolefins having high stereospecificity and bulk density in high yields with a reduced amount of finely divided polymer powder produced when alpha-olefins having at least three carbon atoms are polymerized.

It is a further object of the invention to provide such a solid titanium catalyst component, a preliminary olefin polymerization catalyst and an olefin polymerization catalyst both comprising the solid titanium catalyst component and a process for the polymerization of olefins using such catalysts.

SUMMARY OF THE INVENTION

The invention provides a process for preparing a solid titanium catalyst component which comprises:

(1) a step wherein a suspension is prepared which contains a solid material prepared by contacting a magnesium compound with a first titanium compound and having a polybasic carboxylic acid ester supported thereon;

(2) a step wherein the solid material is separated from the suspension; and (3) a step wherein the solid material is contacted with a second titanium compound under heating;

wherein while the solid material is separated from the suspension in the step (2) and the solid material is supplied to the step (3), the solid material is maintained at a temperature in the range of 70–130° C.

The invention further provides an olefin polymerization catalyst which comprises:

(A) the solid titanium catalyst component as prepared by the process as mentioned above;

(B) an organometallic compound; and (C) a silane compound having Si—O—C bond in the molecule.

The invention also provides a preliminary olefin polymerization catalyst which is prepared by polymerizing an olefin or two or more olefins in the presence of catalyst components comprising:

(A) the solid titanium catalyst component as prepared by the process as mentioned above;

(B) an organometallic compound; and optionally (C) a silane compound having Si—O—C bond in the molecule.

The invention still further provides a process for the polymerization of olefins which comprises polymerizing an olefin or copolymerizing two or more olefins in the presence of the olefin polymerization catalyst as mentioned above.

According to the invention, there is further provided a process for the polymerization of olefins which comprises polymerizing an olefin or copolymerizing two or more olefins in the presence of a polymerization catalyst which comprises:

the above mentioned preliminary olefin polymerization catalyst, and optionally (B) an organometallic compound and/or (C) a silane compound having Si—O—C bond in the molecule.

DESCRIPTION OF THE PREFERRED EMBODIMENTS

Figure 1:
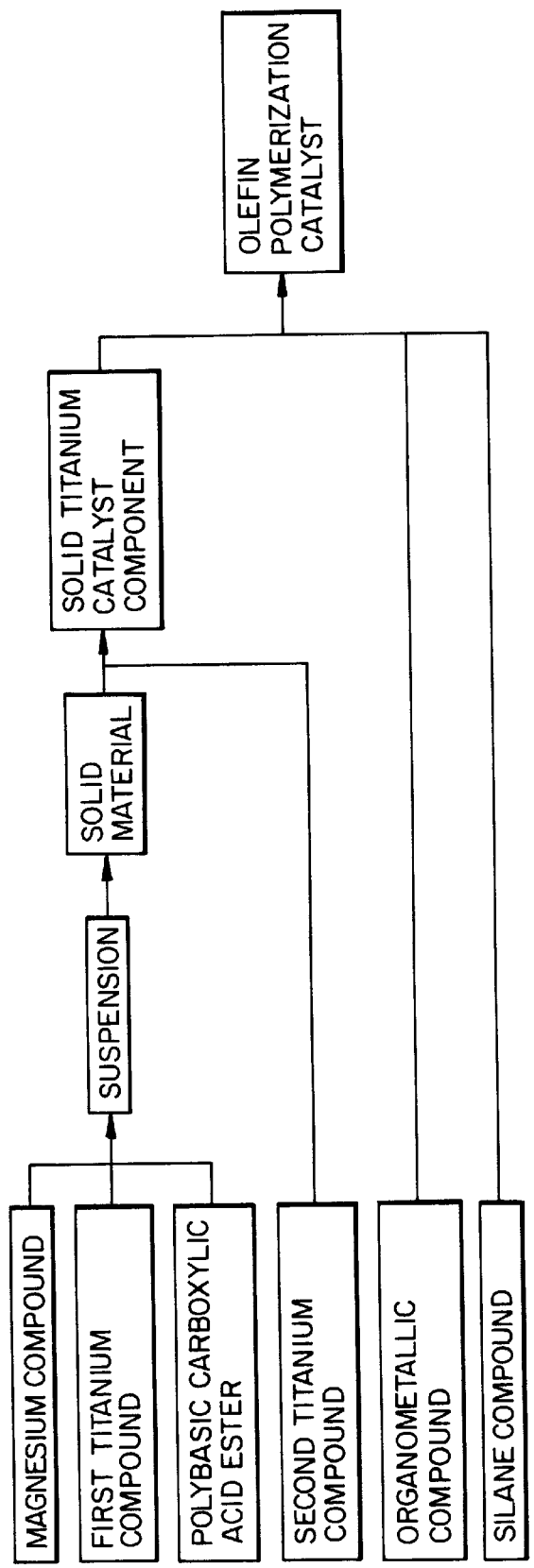
FIG. 1 shows the steps for preparation of solid titanium catalyst component and for the polymerization of olefins according to the invention.

The preparation of the solid titanium catalyst component of the invention will be first described. As illustrated in FIG. 1, the solid titanium catalyst component is prepared by carrying out the following steps:

(1) a step wherein a suspension is prepared which contains a solid material prepared by contacting a magnesium compound with a first titanium compound and having a polybasic carboxylic acid ester supported thereon;

(2) a step wherein the solid material is separated from the suspension; and (3) a step wherein the solid material is contacted with a second titanium compound under heating;

wherein while the solid material is separated from the suspension in the step (2) and the solid material is supplied to the step (3), the solid material is maintained at a temperature in the range of 70–130° C.

(Step(1)—Magnesium Compound)

It is preferred that a magnesium compound is made into a solution and is then contacted with a first titanium compound. When a magnesium compound is soluble in a solvent, the magnesium compound is dissolved in the solvent to form a solution. When a magnesium compound is prepared as a solution, for example, as in the case of a Grignard reagent, the resulting solution may be used as it is. When a magnesium compound is solubilized with a solubilizing agent, the magnesium compound may be dissolved in the solubilizing agent as a solvent. The magnesium compound may be dissolved in a solvent such as a hydrocarbon solvent in the presence of the solubilizing agent.

However, when a magnesium compound is used which is solid at normal temperatures and is not soluble in common solvents inclusive of the solubilizing agent, the magnesium compound may be dispersed in a solvent to form a suspension, and the suspension may be contacted with the first titanium compound.

The magnesium compound used in the invention may or may not have a reducing ability. The magnesium compound having a reducing ability includes an organomagnesium compound which may be represented by the formula:

$$X_nM_gR_{2-n}$$

wherein n is a numeral which fulfils the condition of $0 \leq n < 2$; R is a hydrogen, or an alkyl, an aryl or a cycloalkyl of 1–20 carbons; when n is 0, the two R's may be the same or different from each other; X is a halogen atom.

Illustrative of the magnesium compound having a reducing ability are dialkyl magnesiums such as dimethylmagnesium, diethylmagnesium, dipropylmagnesium, dibutylmagnesium, diamylmagnesium, dihexylmagnesium, didecylmagnesium, octylbutylmagnesium or ethylbutylmagnesium; alkyl magnesium halides such as ethylmagnesium chloride, propylmagnesium chloride, butylmagnesium chloride, hexylmagnesium chloride or amylmagnesium chloride; and alkyl magnesium alkoxides such as butylethoxymagnesium, ethylbutoxymagnesium or octylbutoxymagnesium. In addition, alkyl magnesium hydrides such as butylmagnesium hydride are one of further examples of the magnesium compound having a reducing ability.

In turn, illustrative of the magnesium compound having no reducing ability are magnesium halides such as magnesium chloride, magnesium bromide, magnesium iodide or magnesium fluoride; alkoxy magnesium halides such as methoxymagnesium chloride, ethoxymagnesium chloride, isopropoxymagnesium chloride, butoxymagnesium chloride or octoxymagnesium chloride; aryloxy magnesium halides such as phenoxymagnesium chloride or methylphenoxymagnesium chloride; alkoxy magnesiums such as ethoxymagnesium, isopropoxymagnesium, butoxymagnesium, n-octoxymagnesium or 2-ethylhexoxymagnesium; aryloxy magnesiums such as phenoxymagnesium or dimethylphenoxymagnesium; and magnesium carboxylates such as magnesium laurate or magnesium stearate.

Beside the above mentioned, magnesium hydride may be used as a magnesium compound. Metallic magnesium may also be used in place of the magnesium compound.

The magnesium compound having no reducing ability may be derived from the magnesium compound having a reducing ability or may be prepared when the catalyst component is prepared. In order to prepare a magnesium compound having no reducing ability from a magnesium compound having a reducing ability, for example, the latter may be put into contact with polysiloxane compounds, halogen-containing silane compounds, halogen-containing aluminum compounds, esters, alcohols, halogen-containing compounds, or compounds having hydroxyl groups or active carbon-oxygen bonds in the molecule.

The magnesium compound, whether it has a reducing ability or it has not, may be in the form of complex compounds with organometallic compounds such as of aluminum, zinc, boron, beryllium, sodium or potassium which will be hereinafter mentioned, or in the form of mixtures with other metal compounds. The magnesium compound may be used singly or as a mixture of two or more.

The magnesium compound used in the invention is not limited to those as exemplified as above, however, it is preferred that the magnesium compound exists in the form of halogen-containing magnesium compounds in the solid titanium catalyst component prepared. Accordingly, when a magnesium compound containing no halogens is used, it is desirable that the magnesium compound be contacted with a halogen-containing compound during the preparation process of solid titanium catalyst component.

Among the magnesium compounds mentioned above, those having no reducing ability are preferred, inter alia, halogen-containing magnesium compounds. In particular, magnesium chloride, alkoxy magnesium chlorides or aryloxy magnesium chlorides are most preferred.

When magnesium compounds which are solid at normal temperatures are used, some of such magnesium compounds can be solubilized with a solubilizung agent in such a solubilizung agent, thereby forming a solution.

The solubilizung agent usable includes, for example, alcohols, phenols, ketones, aldehydes, ethers, amines, pyridines and metal acid esters. More specifically, the solubilizung agent may be exemplified by alcohols of 1–18 carbons such as methanol, ethanol, propanol, butanol, pentanol, hexanol, 2-ethylhexanol, octanol, dodecanol, octadecyl alcohol, oleyl alcohol, benzyl alcohol, phenylethyl alcohol, cumyl alcohol or isopropylbenzyl alcohol; halogen-containing alcohols of 1–18 carbons such as trichloromethanol, trichloroethanol or trichlorohexanol; phenols of 6–20 carbons which may carry lower alkyl groups as substituents thereon such as phenol, cresol, xylenol, ethylphenol, propylphenol, nonylphenol, cumylphenol or naphthol; ketones of 3–15 carbons such as acetone, methyl ethyl ketone, methyl isobutyl ketone, ethyl n-butyl ketone, acetophenone, benzophenone, benzoquinone or cyclohexanone; aldehydes of 2–15 carbons such as acetaldehyde, propionaldehyde, octyl aldehyde, benzaldehyde, tolualdehyde or naphthoaldehyde; ethers of 2–20 carbons such as methyl ether, ethyl ether, isopropyl ether, butyl ether, amyl ether, tetrahydrofuran, ethyl benzyl ether, ethylene glycol dibutyl ether, anisole or diphenyl ether; amines such as trimethylamine, triethylamine, tributylamine, tribenzylamine, tetramethylenediamine or hexamethylenediamine; pyridines such as pyridine, methylpyridines, ethylpyridines, propylpyridines, dimethylpyridines, ethylmethylpyridines, trimethylpyridines, phenylpyridines, benzylpyridines or chloropyridines; and metal acid esters such as tetraethoxytitanium, tetra-n-propoxytitanium, -tetraisopropoxytitanium, tetrabutoxytitanium, tetrahexoxytitanium, tetraethoxyzirconium or tetrabutoxyzirconium.

Among the variety of solubilizing agents as mentioned above, alcohols or metal acid esters are preferred, and in particular, alcohols of not less than 6 carbons are most preferred. In order to solubilize a magnesium compound with an alcohol of not less than 6 carbons, the alcohol is used usually in an amount of not less than 1 mole part, preferably in an amount of not less than 1.5 mole parts, per mole part of magnesium compound. There is no specific upper limit in the amount of the solubilizing agent used, however, it is preferred that the solubilizing agent is used in an amount of not more than 40 mole parts per mole part of the magnesium compound used from the economical stand-point. On the other hand, when a lower alcohol of not more than 5 carbons is used as a solubilizing agent to solubilize a magnesium compound, it is necessary to use the solubilizing agent in an amount of not less than about 15 mole parts per mole part of the magnesium compound used.

A solid magnesium compound is solubilized with a solubilizing agent by admixing the magnesium compound with the agent, if necessary followed by heating the mixture. The magnesium compound is solubilized in this way at a temperature usually in the range of 0–200° C., preferably in the range of 20–180° C., most preferably in the range of 50–150° C.

A solid magnesium compound may be dissolved in a solvent such as a hydrocarbon solvent in the presence of the solubilizing agent. The hydrocarbon solvent includes, for example, aliphatic hydrocarbons such as pentane, hexane, heptane, octane, decane, dodecane, tetradecane or kerosene; alicyclic hydrocarbons such as cyclopentane, methylcyclopentane, cyclohexane, methylcyclohexane, cyclooctane or cyclohexene; halogenated hydrocarbons such as dichloroethane, dichloropropane,, trichloroethylene or chlorobenzene; and aromatic hydrocarbons such as benzene, toluene or xylene.

According to the invention, it is especially preferred that a magnesium compound, preferably a halogenated magnesium, inter alia, magnesium chloride, is used in the form of a solution in a hydrocarbon solvent in the presence of an alcohol as a solubilizing agent. However, it is also preferred that a dialkoxy magnesium such as diethoxymagnesium is dispersed in a hydrocarbon solvent and the resulting suspension is used for contact with the first titanium compound.

The solubilizing agent solublizes a solid magnesium compound presumably on account of formation of complexes with the magnesium compound. However, when the lower aliphatic alcohol is used as a solubilizing agent in an insufficient amount, it may form coplexes with a magnesium compound, but it does not solubilizes the magnesium compound therein. In this case, however, it is possible to prepare a suspension which contains a solid material having a polybasic carboxylic acid ester supported thereon by the following process in the step (1). Namely, the lower alcohol is reacted with the magnesium compound in a hydrocarbon solvent in the presence of a surfactant to form complexes with the magnesium compound to provide a suspension which contains the complex, and the suspension is then cooled to provide a suspension which contains a solid product, followed by supporting a polybasic carboxylic acid ester thereon.

(Step (1)—First Titanium Compound)

According to the invention, a titanium compound which is tetravalent and is per se liquid at normal temperatures is preferably used as the first titanium compound. The first titanium compound preferably used in the invention has the formula:

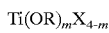

$$Ti(OR)_m X_{4-m}$$

wherein R is a monovalent hydrocarbon group, preferably an alkyl of 1–18 carbons; X is a halogen atom, preferably a chlorine or bromine atom; m is an integer of 0–4.

The first titanium compound as mentioned above includes, for example, tetrahalogenated titaniums such as titanium tetrachloride, titanium tetrabromide or titanium tetraiodide; trihalogenated alkoxy titaniums such as trichloromethoxytitanium, trichloroethoxytitanium, trichloro-n-butoxytitanium, tribromoethoxytitanium or tribromoisobutoxytitanium; dihalogenated dialkoxy titaniums such as dichlorodimethoxytitanium, dichlorodiethoxytitanium, dichlorodi-n-butoxytitanium or dibromodiethoxytitanium; monohalogenated trialkoxy titaniums such as chlorotrimethoxytitanium, chlorotriethoxytitanium, chlorotri-n-butoxytitanium or bromotriethoxytitanium; and tetraalkoxy titaniums such as tetramethoxytitanium, tetraethoxytitanium, tetra-n-butoxytitanium, tetraisobutoxytitanium or tetra(2-ethylhexyloxy)titanium. The first titanium compound may be used singly or as a mixture of two or more. Among the first titanium compounds as above, a tetraalkoxy titanium is preferred with titanium tetrachloride being most preferred.

The first titanium compound is per se liquid at normal temperatures, and may be used as it is. However, if necessary, the first titanium compound may be used as a solution in a hydrocarbon solvent. The hydrocarbon solvent includes, as mentioned hereinbefore, for example, aliphatic hydrocarbons such as pentane, hexane, heptane, octane, decane, dodecane, tetradecane or kerosene; alicyclic hydrocarbons such as cyclopentane, methylcyclopentane, cyclohexane, methylcyclohexane, cyclooctane or cyclohexene; halogenated hydrocarbons such as dichloroethane, dichloropropane, trichloroethylene-or chlorobenzene; and aromatic hydrocarbons such as benzene, toluene or xylene.

The first titanium compound is used usually in an amount of 0.01–1000 mole parts, preferably in an amount of 0.1–200 mole parts, per mole part of the magnesium compound used.

(Step (1)—Electron Donor)

When a magnesium compound in the form of a solution is contacted with the first titanium compound to form a solid product, it is desirable that the magnesium compound is contacted with the first titanium compound in the presence of an electron donor so that the finally obtained solid titanium catalyst component having a uniform shape and particle size.

The electron donor usable includes, for example, organic carboxylic acid esters preferably of 2–18 carbons such as methyl formate, methyl acetate, ethyl acetate, vinyl acetate, propyl acetate, isobutyl acetate, t-butyl acetate, octyl acetate, cyclohexyl acetate, methyl chloroacetate, ethyl dichloroacetate, ethyl propionate, ethyl pyruvate, ethyl pivalate, methyl butyrate, ethyl valerate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluylate, ethyl toluylate, amyl toluylate, ethyl ethylbenzoate, methyl anisate, ethyl anisate, ethyl ethoxybenzoate, γ-butyrolactone, δ-valerolactone, coumarin or phthalides; aliphatic carboxylic acids such as formic acid, acetic acid, propionic acid, butyric acid or valeric acid; acid anhydrides such as acetic anhydride, phthalic anhydride, maleic anhydride, benzoic anhydride, trimellitic anhydride or tetrahydrophthalic anhydride; ketones such as acetone, methyl ethyl ketone, methyl isobutyl ketone, ethyl n-butyl ketone, acetophenone, benzophenone, benzoquinone or cyclohexanone; ethers such as methyl ether, ethyl ether, isopropyl ether, butyl ether, amyl ether, ethyl benzyl ether, ethylene glycol dibutyl ether, anisole or diphenyl ether; alkoxyl group-containing alcohols such as butyl cellosolve or ethyl cellosolve; aliphatic carbonates such as dimethyl carbonate, diethyl carbonate or ethylene carbonate; alkyl silicates such as methyl silicate or ethyl silicate; silane compounds such as diphenyldimethoxysilane; and organophosphorous compounds, preferably organic phosphites, such as trimethyl phosphite or triethyl phosphite.

The electron donor may be used usually in an amount of 0.01–5 mole parts, preferably in an amount of 0.02–2 mole parts, most preferably in an amount of 0.05–1 mole parts, per mole part of the magnesium compound used.

(Step (1)—Polybasic Carboxylic Acid Ester)

According to the invention, there is prepared in the step (1) a suspension which comprises a solid material prepared by contacting the magnesium compound with the first titanium compound and having a polybasic carboxylic acid ester supported thereon. The polybasic carboxylic acid ester usable includes, for example, aliphatic, alicyclic and aromatic polybasic carboxylic acid esters.

The aliphatic polybasic carboxylic acid ester includes, for example, diethyl succinate, dibutyl succinate, diethyl methylsuccinate, diisopropyl α-methylglutarate, diethyl methylmalonate, diethyl ethylmalonate, diethyl isopropylmalonate, diethyl butylmalonate, diethyl phenylmalonate, diethyl diethylmalonate, diethyl dibutylmalonate, monooctyl maleate, dioctyl maleate, dibutyl maleate, dibutyl butylmaleate, diethyl butylmaleate, diisopropyl β-methylglutarate, diallyl ethylsuccinate, di(2-ethylhexyl) fumarate, diethyl itaconate, dioctyl citraconate, diethyl adipate, diisopropyl adipate, diisopropyl sebacate, di(n-butyl) sebacate, di(n-octyl) sebacate and di(2-ethylhexyl) sebacate.

The alicyclic polybasic carboxylic acid ester includes, for example, 1,2-cyclohexanedicarboxylic acid diethyl ester, 1,2-cyclohexanedicarboxylic acid diisobutyl ester, tetrahydrophthalic acid diethyl ester and nagic acid diethyl ester.

The aromatic polybasic carboxylic acid ester includes, for example, monoethyl phthalate, dimethyl phthalate, methylethyl phthalate, monoisobutyl phthalate, diethyl phthalate, ethylisobutyl phthalate, di(n-propyl) phthalate, diisopropyl phthalate, di(n-butyl) phthalate, diisobutyl phthalate, di(n-heptyl) phthalate, di(2-ethylhexyl) phthalate, di(n-octyl) phthalate, dineopentyl) phthalate, didecyl phthalate, benzylbutyl phthalate, diphenyl phthalate, diethyl naphthalenedicarboxylate, dibutyl naphthalenedicarboxylate, triethyl trimellitate or dibutyl trimellitate.

According to the invention, as the polybasic carboxylic acid ester, an aromatic ortho-dicarboxylic acid monoester or diester which has the formula (I):

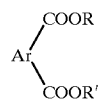

(I)

wherein Ar is a divalent aromatic hydrocarbon group of 6–14 carbons; R is a monovalent hydrocarbon group of 1–20 carbons; and R' is a hydrogen or a monovalent hydrocarbon group of 1–20 carbons, is in particular preferred, which will be for simplicity referred to as the aromatic dicarboxylic acid esters herein after.

In the above formula, Ar is preferably phenylene or naphthylene which may carry thereon alkyl substituents. When R and R' are hydrocarbon groups, they may be the same or different from each other. The hydrocarbon group includes, for example, an alkyl or a cycloalkyl of 1–20 carbons, an aryl, an alkyl aryl or an aryl alkyl of 6–20 carbons.

The aromatic dicarboxylic acid ester includes, for example, monoethyl phthalate, dimethyl phthalate, methylethyl phthalate, monoisobutyl phthalate, diethyl phthalate, ethylisobutyl phthalate, di(n-propyl) phthalate, diisopropyl phthalate, di(n-butyl) phthalate, diisobutyl phthalate, di(n-heptyl) phthalate, di(2-ethylhexyl) phthalate, di(n-octyl) phthalate, dineopentyl phthalate, didecyl phthalate, benzylbutyl phthalate, diphenyl phthalate, diethyl naphthalenedicarboxylate or dibutyl naphthalenedicarboxylate. The aromatic dicarboxylic acid ester may be used singly or as a mixture of two or more. Among the above exemplified aromatic dicarboxylic acid esters, phthalic acid dialkyl esters are particularly preferred.

(Step (1)—Preparation of Solid Material)

According to the invention, in the step (1), the suspension which contains a solid material having the polybasic carboxylic acid ester supported thereon may be prepared either by contacting the magnesium compound with the first titanium compound in the presence of the polybasic carboxylic acid ester, or by contacting the magnesium comound with the first titanium compound, and then contacting the resulting solid product with the polybasic carboxylic acid ester, the latter being preferred. The contact of the magnesium comound with the first titanium compound in the step (1) may be often referred to as the first titanation hereinafter.

Further according to the invention, it is in particular preferred that a solution of the magnesium compound is contacted with the first titanium compound in the presence of the electron donor to carry out the first titanation thereby to form a solid product, and the solid product is then contacted with the polybasic carboxylic acid ester to support the ester on the solid product thereby to form a suspension which contains the resultant solid material. The preparation of the suspension which contains the solid material in this manner provides a solid titanium catalyst component which is uniform in shape and particle size. Alternatively, as set forth hereinbefore, such a suspension which contains the solid material may be prepared by contacting the magnesium comound with the first titanium compound in the presence of the polybasic carboxylic acid ester. The preparation of the suspension which contains the solid material in this manner also provides a solid titanium catalyst component which is uniform in shape and particle size.

According to the invention, there are further processes for preparing the suspension which contains the solid material on which a polybasic carboxylic acid ester is supported.

(1) There is prepared a suspension of a dialkoxymagnesium represented by the formula:

$Mg(OR^1)_2$ wherein $R^1$ is an alkyl of 1–20 carbons, in a hydrocarbon solvent, and the suspension is contacted with the first titanium compound to provide a solid product. While or after the contact, a polybasic carboxylic acid ester is supported on the solid product.

(2) There is prepared a solution of an organic magnesium compound represented by the formula:

$M_g R^2 R^3$ wherein $R^2$ and $R^3$ are independently an alkyl of 1–20 carbons, and the solution is contacted with the first titanium compound to provide a solid product. While or after the contact, a polybasic carboxylic acid ester is supported on the solid product.

(3) There is prepared a suspension of solid complexes of a halogenated magnesium compound with an aliphatic lower alcohol of five carbons or less in a hydrocarbon solvent in the presence of a surfactant. The suspension is then cooled to provide a solid product. While or after the cooling, a polybasic carboxylic acid ester is supported on the solid product.

According to the invention, the suspension which contains the solid material having the polybasic carboxylic acid ester supported thereon may be prepared in the presence of a porous carrier material so that the resulting solid material is supported on the porous carrier material.

The porous carrier material usable includes, for example, inorganic oxides such as alumina, silica, boron oxide, magnesium oxide, calcium oxide, titanium oxide, zinc oxide, tin oxide, barium oxide or thorium oxide, and resins such as a styrene-divinylbenzene copolymer resin. Among these carrier materials, alumina, silica or a styrene-divinylbenzene copolymer resin is preferred.

The temperature at which the magnesium comound is contacted with the first titanium compound and the polybasic carboxylic acid ester is then supported thereon to form the suspension which contains the solid material, or the magnesium compound is contacted with the first titanium compound in presence of the polybasic carboxylic acid ester to form the suspension which contains the solid material, is usually in the range of –70° C. to 200° C., preferably in the range of –50° C. to 150° C., most preferably in the range of –30° C. to 130° C.

The polybasic carboxylic acid ester is supported on the solid product prepared from the magnesium comound and the first titanium compound usually in an amount of 0.01–5 mole parts, preferably in an amount of 0.02–0.5 mole parts, per mole part of the magnesium compound used.

(Step (2))

In the step (2), the solid material is separated from the suspension prepared in the step (1) and the solid material is supplied to the step (3). According to the invention, while the solid material is separated from the suspension and the solid material is supplied to the step (3), the solid material is maintained at a temperature in the range of 70–130° C., preferably in the range of 75–125° C.

Figure 2:
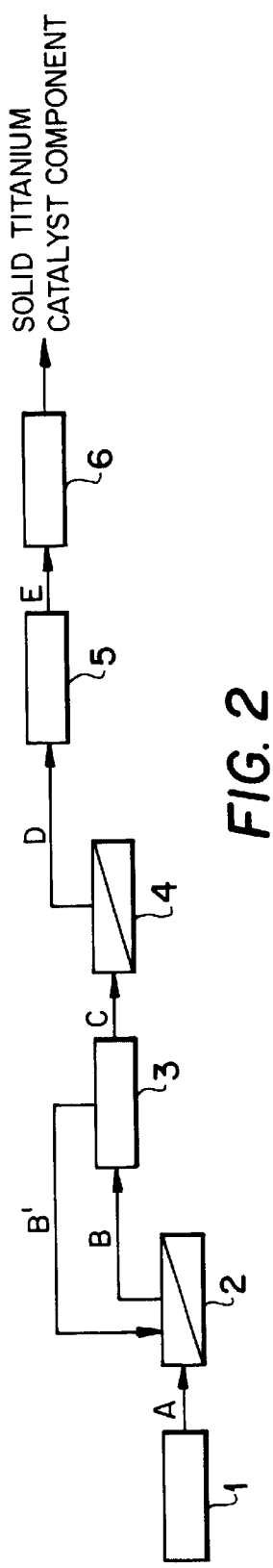
FIG. 2 shows an example of arrangement of apparatus for the preparation of solid titanium catalyst component of the invention.

More specifically, as illustrated in FIG. 2, as the step (1), the suspension is prepared in a first reactor 1, and after the reaction, as the step (2), the suspension is supplied to a first filter 2 through a first pipe A where the solid material is separated from the suspension by filtration. The resulting solid material is then supplied to a second reactor 3 through a second pipe B where the solid material is contacted with a second titanium as the step (3) which will be set forth in detail hereinafter. The contact of the solid material with the second titanium compound in the step (3) may be often referred to as the second titanation hereinafter. The step (1) to the step (3) via the step (2) is carried out in this manner.

The solid material is contacted with the second titanium compound in the second reactor 3 to carry out the second titanation to provide a suspension as set forth above, and the suspension is then supplied to a second filter 4 through a third pipe C where the solid material is separated. The solid material is then supplied to a washing apparatus 5 through a pipe D where the solid material is washed with, for example, a hydrocarbon such as hexane repeatedly until no titanium is detected in the washing. The solid material is finally supplied to a drying apparatus 6 through a pipe E where the solid material is dried thereby providing the solid titanium catalyst component of the invention.

When the step (1), step (2) and step (3) are carried out in a manner as above, all the first pipe A, the first filter 2 and the second pipe B should be maintained at a temperature in the range of 70–130° C. so that the solid material is maintained at the temperature according to the invention.

When the suspension which contains the solid material is supplied from the first reactor 1 to the first filter 2 through the first pipe A to separate the solid material from the suspension, the liquid may be decanted from the suspension and the residual may be supplied to the first filter 2, if necessary.

If necessary, the second titanation may be repeated. In particular, when a magnesium compound is used in the form of suspension in the step (1), it is preferred that the second titanation is repeated. By way of example, as illustrated in FIG. 2, after the second titanation is carried out in the second reactor 3, the resultant suspension is again supplied to the first filter 2 through the pipe B' where the solid material is separated from the suspension by filtration, and the solid material is then again supplied to the second reactor 3 through the pipe B where the solid material is contacted with the second titanium compound to carry out the second titanation again. When the second titanation is repeated in this manner, the pipe B' and the solid material therein should be maintained at the temperature in the range hereinbefore defined as well.

The second titanation may be repeated in another manner. Although not shown in the drawing, a further filter is provided in addition to the first filter 2 to which the suspension is supplied from the first filter 2, and the suspension is filtrated with the further filter, and the resulting solid material is then supplied to the second reactor 3 through a further pipe. When the second titanation is repeated in this manner, the solid material should be maintained at the temperature in the range hereinbefore defined within the further pipe.

As set forth in detail as above, while the solid material is separated from the suspension in the step (2) and the solid material is supplied to the step (3), the solid material is maintained at the temperature as herein-before defined. This makes it possible to provide a solid titanium catalyst component which in turn forms an olefin polymerization catalyst which makes it possible to produce polyolefins with a reduced amount of finely divided polymer powder.

The solid material separated from the suspension in the step (2) may be washed with a hydrocarbon solvent, if necessary, before it is supplied to the step (3). The hydrocarbon solvent usable may be the same as the hydrocarbon solvents which are used as a diluent for the first titanium compound. In particular, aliphatic hydrocarbon solvents such as hexane, heptane or decane, or aromatic hydrocarbon solvents such as toluene or xylene are preferred. Furthermoe, when the solid material separated from the suspension in the step (2) is supplied to the step (3), a small amount of a titanium compound, which may be the same as either the first or the second, may be added to the solid material.

The infrared absorption specrum of the solid material which is produced in the step (1) in an industrial scale as exemplified in examples which will be hereinafter described shows an absorption peak which, however, is not found in the infrared absorption specrum of the solid material prepared in a laboratory scale. On the other hand, the reaction of titanium tetrachloride with diisobutyl phthalate at a temperature of not more than 70° C. provides a solid product which has the same infrared absorption peak as above. Accordingly, it is likely that while the solid material is separated from the suspension in the step (2) and the solid material is supplied to the step (3), if the solid material is placed at a temperature not more than 70° C., undesirable reactions take place between the titanium compound and the polybasic carboxylic acid ester, adversely affecting the finally obtained solid titanium catalyst component. It is also found, as seen in Reference Examples 2 and 4 which will be described hereinafter, that when the solid material prepared in the step (1) is placed at a temperature of more than 135 C, the finally obtained solid titanium catalyst component has a tendency to support a smaller amount of titanium thereon.

(Step (3)—Preparation of Solid Titanium Catalyst Component)

According to the invention, the solid material prepared in the step (2) is contacted with a second titanium compound in the step (3) under heating. The second titanium compound may be the same as or different from the first titanium compound used in the step (1) if it is per se liquid at normal temperatures. As in the case with the first titanium compound, the second titanium compound is preferably a titanium tetrachloride, and most preferably it is titanium tetrachloride. The contact of the solid material with the second titanium compound may be carried out in the presence of such a hydrocarbon solvent as is exemplified as the diluent for the first titanium compound.

In the step (3), the second titanium compound is used in an amount of 5–200 mole parts, preferably 10–100 mole parts, per mole part of the magnesium compound used.

The solid material is contacted with the second titanium compound usually at a temperature of 40–200° C., preferably 50–180° C., more preferably 60–160° C., for a period of one minute to 10 hours, preferably 10 minutes to 5 hours. It is believed that the reaction of the solid material with the second titanium compound under heating forms a solid titanium catalyst component of the invention.

After the solid material is contacted with the second titanium compound for a time as mentioned, the resulting solid titanium catalyst component is recovered from the suspension by filtration. It is desirable that the thus recovered solid titanium catalyst component is washed with a hydrocarbon solvent such as hexane repeatedly until no free titanium is detected from the washing.

The thus obtained solid titanium catalyst component of the invention contains magnesium, titanium, halogen atoms and the polybasic carboxylic acid ester, and in addition, the electron donor if it has been used.

According to the invention, the solid titanium catalyst component contains magnesium in an amount of 5–35% by weight, preferably 8–30% by weight, more preferably 10–28% by weight, most preferably 12–25% by weight; titanium in an amount of 0.3–10% by weight, preferably 0.5–8% by weight, more preferably 0.8–6% by weight, most preferably 1–5% by weight; halogen atoms in an amount of 30–75% by weight, preferably 35–75% by weight, more preferably 38–72% by weight, most preferably 40–70% by weight; and the polybasic carboxylic acid ester, and if used, the electron donor, in an amount of 0.5–30% by weight, preferably 1–27% by weight, more preferably 3–25% by weight, most preferably 5–23% by weight.

Further according to the invention, the solid titanium catalyst component has a halogen/titanium (atomic ratio) usually of 2–200, preferably 4–90; a magnesium/titanium (atomic ratio) usually of 1–100, preferably 2–50; and an electron donor/titanium (molar ratio) usually of 0.01–100, preferably 0.05–50.

The solid titanium catalyst component as defined as above mentioned, when it is used as a component of an olefin polymerization catalyst, provides polyolefins in high yields, and in addition, when it is used as a polymerization catalyst for alpha-olefins having at least three carbon atoms, it provides highly stereospecific polyolefins in high yields with a reduced amount of finely divided polymer powder (for example, having a particle size of not more than 100 micron meters).

(Preparation of Olefin Polymerization Catalyst)

The olefin polymerization catalyst of the invention comprises the solid titanium catalyst component, an organometallic compound and a silane compound having Si—O—C bond in the molecule. The organometallic compound usable preferably contains a metal of the group I, II or III of the periodic table. More specifically, the organometallic compound includes, for example, organoaluminum compounds, complex alkylated compounds of aluminum with one of the group I metals, or organometallic compounds of the group II metals. (Preparation of olefin polymerization catalyst - organoaluminum compounds) One of the organoaluminum compounds usable preferably has the formula:

$$R^a{}_n AlX_{3-n}$$

wherein $R^a$ is a hydrocarbon group of 1–12 carbons; X is a halogen atom or hydrogen atom; and n is a numeral in the range of 1–3.

The hydrocarbon group $R^a$ is preferably an alkyl, a cycloalkyl or an aryl of 1–12 carbons, and is exemplified by methyl, ethyl, n-propyl, isopropyl, isobutyl, pentyl, hexyl, octyl, cyclopentyl, cyclohexyl, phenyl or tolyl.

Examples of preferred organoaluminum compounds are trialkyl aluminums such as trimethylaluminum, triethylaluminum, triisopropylaluminum, triisobutylaluminum, trioctylaluminum or tri(2-ethylhexyl) aluminum; alkenyl aluminums such as isoprenylaluminum; dialkyl aluminum halides such as dimethylaluminum chloride, diethylaluminum chloride, diisopropylaluminum chloride, diisobutylaluminum chloride or dimethylaluminum bromide; alkyl aluminum sesquihalides such as methylaluminum sesquichloride, ethylaluminum sesquichloride, isopropylaluminum sesquichloride, butylaluminum sesquichloride or ethylaluminum sesquibromide; alkyl aluminum dihalides such as methylaluminum dichloride, ethylaluminum dichloride, isopropylaluminum dichloride or ethylaluminum dibromide; alkyl aluminum hydrides such as diethylaluminum hydride or diisobutylaluminum hydride.

Another organoaluminum compounds usable has the formula:

$$R^a{}_n AlY_{3-n}$$

wherein $R^a$ is the same as above mentioned; Y is —OR$^b$ group, —OSiR$^c{}_3$ group, —OAlR$^d{}_z$ group, —NR$^e{}_z$ group, —SiR$^f{}_3$ group or —N(R$^9$)AlR$^h{}_2$ group: n is a numeral of 1–2; R$^b$, R$^c$, R$^d$ and R$^h$ are independently methyl, ethyl, isopropyl, isobutyl, cyclohexyl or phenyl, for example; R$^e$ is hydrogen, methyl, ethyl, isopropyl, phenyl or trimethylsillyl, for example; and R$^f$ and R$^g$ are indeoendently methtyl or ethyl, for example.

Accordingly, these organoaluminum compounds may be exemplified by, for example:
(i) $R^a{}_n Al(OR^b)_{3-n}$ such as dimethylaluminum methoxide, diethylaluminum ethoxide or diisobutylaluminum methoxide;
(ii) $R^a{}_n Al(OSiR^c)_{3-n}$ such as Et$_2$Al(OSiMe$_3$), (iso-Bu)$_2$Al(OSiMe$_3$) or (iso-Bu)$_2$Al(OSiEt$_3$);
(iii) $R^a{}_n Al(OAlR^d{}_z)_{3-n}$ such as Et$_2$AlOAlEt$_z$ or (iso-Bu)$_2$AlOAl(iso-Bu)$_2$;
(iv) $R^a{}_n Al(NR^e{}_2)_{3-n}$ such as Me$_2$AlNEt$_2$, Et$_2$AlNHMe, Me$_2$AlNHEt, Et$_2$AlN(Me$_3$Si)$_2$ or (iso-Bu)$_2$AlN(Me$_3$Si)$_2$;
(v) $R^a{}_n Al(SiR^f{}_3)_{3-n}$ such as (iso-Bu)$_2$AlSiMe$_3$;
(vi) $R^a{}_n Al[N(R^9)—AlR^h{}_2]_{3-n}$ such as Et$_2$AlN(Me)—AlEt$_2$ or (iso-Bu)$_2$AlN(Et)Al(iso-Bu)$_2$.

As further examples of organoaluminum compounds usable, there may be mentioned such organoaluminum compounds as have two or more aluminum atoms connected with each other by oxygen or nitrogen atoms. Examples of such organoaluminum compounds are (C$_2$H$_5$)$_2$AlOAl(C$_2$H$_5$)$_2$, (C$_4$H$_9$)$_2$AlOAl(C$_4$H$_9$)$_2$ or (C$_2$H$_5$)$_2$AlNAl(C$_2$H$_5$)Al(C$_2$H$_5$)$_2$. Aluminoxanes such as methylaluminoxane may also be used as an organoaluminum compound.

Among the above mentioned, organoaluminum compounds having the formula $R^a{}_3Al$, $R^a{}_n Al(OR^b)_{3-n}$ or $R^a{}_n Al(OAlR^d{}_2)_{3-n}$ are particularly preferred.

The complex alkylated compound of aluminum with a group I metal has the formula:

$$M^1 AlR^j{}_4$$

wherein M$^1$ is Li, Na or K; R$^j$ is a hydrocarbon group of 1–15 carbons. The complex alkylated compound is exemplified by LiAl(C$_2$H$_5$)$_4$ or LiAl(C$_7$H$_{15}$)$_4$, for example.

The organometallic compound of a group II metal has the formula:

$$R^k R^L M^2$$

wherein R$^k$ and R$^L$ are independently a hydrocarbon group of 1–15 carbons or a halogen atom; R$^k$ and R$^L$ may be the same or different from each other; however, both are not halogen atoms at the same time; M$^2$ is Mg, Zn or Cd.

The organometallic compound of a group II metal may be exemplified by, for example, diethylzinc, diethylmagnesium, butylethylmagnesium, ethylmagnesium chloride or butylmagnesium chloride.

The organometallic compound may be used singly or as a mixture of two or more.
(Preparation of Olefin Polymerization Catalyst—Silane Compounds)

The olefin polymerization catalyst of the invention is prepared from the solid titanium catalyst component, the organometallic compound, both already described hereinbefore, and a silane compound having Si—O—C bond in the molecule.

The silane compound usable has preferably the formula:

$$R_n Si(OR')_{4-n}$$

wherein R and R' are independently a hydrocarbon group having 1–20 carbons which may carry halogen atoms as substituents thereon; and n is an integer of 0–4.

Accordingly, the silane compound includes, for example, trimethylmethoxysilane, trimethylethoxysilane, tricyclopentylmethoxysilane, tricyclopentylethoxysilane, dicyclopentylmethylmethoxysilane, dicyclopentylethylmethoxysilane, dicyclopentylmethylethoxysilane, cyclopentyldimethylmethoxysilane, cyclopentyldiethylmethoxysilane, cyclopentyldimethylethoxysilane, dicyclohexyldimethoxysilane, cyclohexylmethyldimethoxysilane, cyclohexylmethyldiethoxysi lane, dicyclopentyldimethoxysi lane, bis(2-methylcyclopentyl)dimethoxysilane, bis(2,3-dimethylcyclopentyl)dimethoxysilane, dicyclopentyldiethoxysi lane, dimethyldimethoxysi lane, dimethyldiethoxysilane, diisopropyldimethoxysilane, t-butylmethyldimethoxysilane, t-butylmethyldiethoxysilane, t-amylmethyldiethoxysilane, diphenyldimethoxysilane, phenylmethyldimethoxysi lane, diphenyldiethoxysi lane, bis(o-tolyl)dimethoxysilane, bis(m-tolyl)dimethoxysilane, bis(p-tolyl)dimethoxysilane, bis(p-tolyl)diethoxysilane, bis(ethylphenyl)dimethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, γ-chloropropyltrimethoxysilane, methyltriethoxysilane, ethyltriethoxysilane, vinyltriethoxysilane, t-butyltriethoxysilane, n-butyltriethoxysilane, isobutyltriethoxysilane, phenyltriethoxysilane, γ-aminopropyltriethoxysilane, chlorotriethoxysilane, ethyltriisopropxysilane, vinyltributoxysilane, cyclohexyltrimethoxysilane, cyclohexyltriethoxysilane, 2-norbornanetrimethoxysilane, 2-norbornanetriethoxysilane, 2-norbornanemethyldimethoxysilane, trimethylphenoxysilane, methyltriallyloxysilane, vnyltris(β-methoxyethoxy)silane, vinyltriacetoxysilane, cyclopentyltrimethoxysilane, 2-methylcyclopentyltrimethoxysilane, 2,3-dimethylcyclopentyltrimethoxysilane, cyclopentyltriethoxysilane or hexenyltrimethoxysilane.

Among the above silane compounds, there are in particular preferred cyclohexylmethyldimethoxysilane, ethyltriethoxysilane, n-propyltriethoxysilane, t-butyltriethoxysilane, vinyltriethoxysilane, phenyltriethoxysilane, vinyltributoxysilane, diphenyldimethoxysi lane, phenylmethyldimethoxysi lane, bis(p-tolyl)dimethoxysilane, p-tolylmethyldimethoxysilane, dicyclohexyldimethoxysilane, 2-norbornanetriethoxysilane, 2-norbornanemethyldimethoxysilane, phenyltriethoxysilane, dicyclopentyldimethoxysilane, hexenyltrimethoxysilane, cyclopentyltriethoxysilane, tricyclopentylmethoxysilane or cyclopentyldimethylmethoxysilane.

(Preparation of Olefin Polymerization Catalyst)

The olefin polymerization catalyst of the invention comprises:

(A) the solid titanium catalyst component as prepared as mentioned above;

(B) the organometallic compound as mentioned as above; and (C) the silane compound having Si—O—C bond in the molecule as mentioned above.

The organometallic compund (B) is used in terms of metal contained in the compound usually in an amount of about 1–2000 mole parts, preferably about 2–500 mole parts, per mole part of titanium atom in the solid titanium catalyst component. The silane compound (C) is used usually in an amount of about 0.001–10 mole parts, preferably about 0.01–5 mole parts, per mole part of the metal atom of the organometallic compound.

For the polymerization of olefins, the solid titanium catalyst component (A) is used in terms of titanium atom usually in an amount of about 0.001–100 millimole parts, preferably about 0.05–20 millimole parts, per liter of reaction volume of reactor.

The olefin polymerization catalyst of the invention is advantageously used for the (co)polymerization of ethylene and alpha-olefins such as propylene, 1-butene, 1-pentene, 1-hexene, 3-methyl-1-butene, 3-methyl-1-pentene, 3-ethyl-1-pentene, 4-methyl-1-pentene, 4,4-dimethyl-1- pentene, 4-methyl-1-hexene, 4,4-dimethyl-1-hexene, 4-ethyl-1-hexene, 3-ethyl-1-hexene, 1-octene, 1-decene, 1-dodecene, 1- tetradecene, 1-hexadecene, 1-octadecene or 1-eicosene. Besides the above, the olefin polymerization catalyst is used for polymerization of other vinyl compounds. The vinyl compound includes, for example, cycloolefins such as cyclopentene, cycloheptene, norbornene, 5-ethyl-2-norbornene, tetracyclododecene or 2-ethyl-1,4,5,8-dimethano-1,2,3,4,4a, 5,8,8a-octahydronaphthalene; and vinyl compounds such as styrene, dimethylstyrenes, allylnaphthalenes, allylnorbornanes, vinylnaphthalenes, allyltoluenes, allylbenzene, vinylcyclopentane, vinylcyclohexane, vinylcycloheptane or allyltrialkylsilanes.

However, the olefin polymerization catalyst of the invention is particularly useful for the polymerization of ethylene, propylene, 1-butene, 3-methyl-1-butene, 3-methyl-1-pentene, 4-methyl-1-pentene, vinylcyclohexane, dimethylstyrenes, allyltrialkylsilanes or allylnaphthalenes.

(Process for Polymerization of Olefins)

The process for the polymerization of olefins according to the invention comprises polymerizing an olefin or copolymerizing two or more olefins in the presence of the olefin polymerization catalyst as mentioned above which comprises the solid titanium catalyst component, the organometallic compound and the silane compound having Si—O—C bond in the molecule.

A small amount of diene compounds may be copolymerized with the olefins as above mentioned. The diene compound includes, for example, butadiene, isoprene, 1,3-pentadiene, 1,4-pentadiene, 1,3-hexadiene, 1,4-hexadiene, 1,5-hexadiene, 4-methyl-1,4-hexadiene, 5-methyl-1,4-hexadiene, 6-methyl-1,6-octadiene, 7-methyl-1,6-octadiene, 6-ethyl-1,6-octadiene, 6-propyl-1,6-octadiene, 6-butyl-1,6-octadiene, 6-methyl-1,6-nonadiene, 7-methyl-1,6-nonadiene, 6-ethyl-1,6-nonadiene, 7-ethyl-1,6-nonadiene, 6-methyl-1,6-decadiene, 7-methyl-1,6-decadiene, 6-methyl-1,6-undecadiene, 1,7-octadiene, 1,9-decadiene, ethylidenenorbornene, vinylnorbornene or dicyclopentadiene.

The polymerization of olefins may be carried out by any process; such as liquid phase polymerization, e.g., solution or suspension polymerization, or gas phase polymerization. When the polymerization is carried out in a slurry, such an inert hydrocarbon solvent as mentioed hereinbefore may be used as a reaction solvent, or an olefin which is liquid at a temperature at which the reaction is carried out may also be used as a reaction solvent.

The resulting polyolefins can be controlled in their molecular weight by using a molecular weight controlling agent such as hydrogen thereby to provide polyolefins having high melt indexes.

The polymerization of olefins is carried out usually at a temperature of about 20–300° C., preferably at about 50–150° C., usually under a pressure of normal to 100 kg/cm$^2$, preferably about 2–50 kg/cm$^2$, although somewhat depending on the individual olefins used or manners by which olefins are polymerized. The polymerization of olefins is carried out either batchwise, semi-batchwise or continuously. If necessary, the polymerization may be carried out in two or more stages under different reaction conditions.

The use of a single olefin provides a homopolymer of the olefin, while the use of two more olefins provides a random or block copolymer of the olefins.

(Preparation of Preliminary Olefin Polymerization Catalyst)

According to the invention, a preliminary olefin polymerization catalyst may be prepared and then the olefin polymerization catalyst may be prepared therefrom.

The preliminary olefin polymerization catalyst is prepared by polymerizing an olefin or two or more olefins preliminarily in the presence of catalyst components comprising:

(A) the solid titanium catalyst component as prepared as mentioned above;

(B) the organometallic compound as mentioned above; and optionally (C) the silane compound having Si—O—C bond in the molecule as mentioned above.

For the preparation of the preliminary olefin polymerization catalyst, any alpha-olefin having at least two carbons may be used with no limitation. The alpha-olefin usable includes, for example, ethylene, propylene, 1-butene, 1-pentene, 1-hexene, 3-methyl-1-butene, 3-methyl-1-pentene, 3-ethyl-1-pentene, 4-methyl-1-pentene, 4,4-dimethyl-1-pentene, 4-methyl-1-hexene, 4,4-dimethyl-1-hexene, 4-ethyl-1-hexene, 3-ethyl-1-hexene, 1-octene, 1-decene, 1-dodecene, 1-tetradecene, 1-hexadecene, 1-octadecene or 1-eicosene. Other vinyl compounds or polyene compounds mentioned hereinbefore may be used in place of the olefins above, or may be preliminarily polymerized togeter with the olefins above. The olefin, vinyl compound or polyene compound may be used singly or as a mixture of two or more. The olefin used in the preparation of preliminary olefin polymerization catalyst may be the same as or different from the oefin which is polymerized in a full scale later.

There is no limitation in the method for preliminary polymerization of olefins. By way of example, the olefin may be polymerized in the liquid phase, if necessary in the presence of an inert reaction solvent, or in the gas phase. However, among these methods, it is preferred that the preliminary polymerization is carried out in an inert reaction solvent in the presence of the catalyst components under relatively mild reaction conditions. The resulting polymer thus preliminarily polymerized may be soluble or not in the solvent, with the latter being preferred.

The preliminary polymerization of olefins is carried out either batchwise, semi-batchwise or continuously at a temperature in the range of about −20° C. to 100° C., preferably at about −20° C. to 80° C., more preferably at about −10° C. to 40° C.

In the preliminary polymerization of olefins, the catalyst may be used in a concentration higher than in the later full scale polymerization. Although depending upon the individual catalyst components used, the solid titanium catalyst component (A) is used in terms of titanium atom in an amount of about 0.001–5000 millimole parts, preferably about 0.01–1000 millimole parts, more preferably about 0.1–500 millimole parts, per liter of the volume of reactor, while the organometallic compound (B) is used in such an amount that prelinary (co)polymers are formed usually in an amount of 0.01–2000 g, preferably 0.03–1000 g, more preferably 0.05–200 g, per gram of the solid titanium catalyst component (A). Accordingly, the organometallic compound (B) is used usually in an amount of about 0.1–1000 mole parts, preferably about 0.5–500 mole parts, more preferably about 1–100 mole parts, per mole part of titanium of the solid titanium catalyst component.

In the preliminary polymerization of olefins, the silane compound (C) may be used, if necessary, usually in an amount of 0.01–50 mole parts, preferably about 0.05–30 mole parts, more preferably about 0.1–10 mole parts, per mole part of titanium atom of the solid titanium catalyst component (A). A molecular weight controlling agent such as hydrogen may also be used when the preliminary polymerization of olefins is carried out.

When the preliminary olefin polymerization catalyst is obtained as a slurry or suspension, the catalyst may be used as it is in a later full scale polymerization of olefins, or alternatively the catalyst may be separated from the suspension and then used in the full scale polymerization.

The preliminary olefin polymerization catalyst is used usually to prepare an olefin polymerization catalyst of the invention in combination with the beforementioned organometallic compound and the silane compound. However, the preliminary olefin polymerization catalyst alone may be used as an olefin polymerization catalyst as the case may be. When a silane compound has not been used in the preparation of preliminary olefin polymerization catalyst, an olefin polymerization catalyst of the invention may be prepared from the preliminary olefin polymerization catalyst and the silane compound.

As set forth above, the solid titanium catalyst component of the invention provides an olefin polymerization catalyst which has high olefin polymerization activity and provides polyolefins having high stereospecificity and a high bulk density with a reduced amount of finely divided polymer powder produced.

EXAMPLES

The invention will be described with reference to examples, however, the examples are illustrative only and the invention is not limited thereto.

Example 1
(Preparation of Solid Titanium Catalyst Component (A))

98.5 kg of 2-ethylhexyl alcohol, 78.3 kg of decane and 24 kg of magnsium chloride were placed in a 0.5 m³ capacity vessel, and the mixture was heated to 140° C. to prepare an even solution. 5.6 kg of phthalic anhydride was added to the solution and stirred under heating to provide a colorless and even solution. The solution was then cooled to room temperatures to prepare a solution of the magnesium compound.

As shown in FIG. 2, 0.3 m³ of recovered titanium tetrachloride having the composition below was placed in a one cubic meter capacity first reactor 1, and was cooled to −20° C., whereupon 103.2 kg of the solution of the magnesium compoud was added to the titanium tetrachloride. The recovered titanium tetrachloride was composed of 95.4% by weight of titanium tetrachloride, 0.2% by weight of hexane, 2.2% by weight of octane, 0.2% by weight of nonane, 1.6% by weight of decane and 0.4% by weight of 2-chlorooctane.

The resulting reaction mixture was heated to 110° C. and 8.8 kg of diisobutyl phthalate was added to the mixture followed by stirring for two hours at the temperature. The resulting suspension was sent to a first filter 2 from the first reactor 1 under nitrogen pressure through a first pipe A where the suspension was filtrated to separate the resulting solid material. A small amount of titanium tetrachloride was added to the solid material and was then sent to a one cubic meter capacity second reactor 3 under nitrogen pressure through a second pipe B. While these operations were carried out, the solid material in the first filter 2 as well as the first pipe A through which the suspension was sent to the first filter 2 from the first reactor 1 under pressure, the first filter 2 and the second pipe B were maintained at the temperature indicated in Table 1.

0.4 m³ of the same recovered titanium tetrachloride as above was added to the second reactor 3, the mixture was heated to 110° C. and maintained at the temperature for 20 minutes. The resulting suspension was sent to a second filter 4 under nitrogen pressure through a pipe C where the suspension was filtrated to separate the resulting solid material. A small amount of hexane was added to the solid material and the mixture was supplied to a one cubic meter capacity washing apparatus 5 through a pipe D. The solid material was washed three times each with 0.4 m³ of hexane at 60° C. and then further washed repeatedly with hexane at normal temperatures until no titanium was detected in the supernatant. After the washing in ths way, the solid material was sent to a drying apparatus 6 through a pipe E where the solid material was dried to provide a solid titanium catalyst component of the invention. The composition of the catalyst component is shown in Table 2.

(Polymerization of Propylene)

750 ml of purified hexane was placed in a two liter capacity autoclave and-then 0.0075 millimole of the solid titanium catalyst component in terms of titanium atom together with 0.75 millimole of triethylaluminum, 0.075 millimole of cyclohexylmethyldimethoxysilane (CMMS) at a temperature of 40° C. under a propylene atmosphere.

200 ml of hydrogen was then fed into the autoclave at a temperature of 60° C., followed by heating to 70° C. and maintaining at the temperature for two hours to carry out the polymerization of propylene while the pressure in the autoclave was maintained at 7 kg/cm² G (gage).

After the polymerization, the slurry which contained the resulting polypropylene was filtrated to separate while powder, followed by drying under reduced pressures for ten hours to provide polypropylene. The results of polymerization are shown in Table 3.

Examples 2 and 3
(Preparation of Solid Titanium Catalyst Component (A))

The pipe A, the first filter 2, the solid material in the first filter 2 and the pipe B were maintained at the temperature indicated in Table 1, and otherwise in the same manner as in EXAMPLE 1, a solid titanium catalyst component was prepared. The composition of the catalyst component is shown in Table 2.

(Polymerization of Propylene)

The polymerization of propylene was carried out in the same manner as in EXAMPLE 1 except that the above solid titanium catalyst component was used. The results of polymerization are shown in Table 3.

Reference Examples 1 and 2
(Preparation of Solid Titanium Catalyst Component (A))

The pipe A, the first filter 2, the solid material in the first filter 2 and the pipe B were maintained at the temperature indicated in Table 1, and otherwise in the same manner as in EXAMPLE 1, a solid titanium catalyst component was prepared. The composition of the catalyst component is shown in Table 2.

(Polymerization of Propylene)

The polymerization of propylene was carried out in the same manner as in EXAMPLE 1 except that the above solid titanium catalyst component was used. The results of polymerization are shown in Table 3.

TABLE 1

| | Temperaturec (° C.) | | | | |
|---|---|---|---|---|---|
| | Examples | | | Reference | |
| | 1 | 2 | 3 | 1 | 2 |
| Pipe A | 90 | 105 | 75 | 60 | 135 |
| First Reactor | 100 | 105 | 85 | 70 | 135 |
| Solid Material in First Filter | 100 | 105 | 85 | 70 | 135 |
| Pipe B | 90 | 105 | 75 | 60 | 135 |

TABLE 2

| | Component of Solid Titanium Catalyst Component (% by weight) | | | | |
|---|---|---|---|---|---|
| | Examples | | | References | |
| | 1 | 2 | 3 | 1 | 2 |
| Ti | 2.6 | 2.3 | 2.8 | 3.0 | 2.5 |
| Cl | 60 | 61 | 60 | 60 | 62 |
| Mg | 18 | 19 | 18 | 18 | 19 |
| DIBP[1] | 14.5 | 13.5 | 14.8 | 15.4 | 12.1 |
| OEH[2] | 0.0 | 0.0 | 0.0 | 0.0 | 0.0 |

Notes:
[1] Diisobutyl phthalate
[2] Ethylhexoxyl group

TABLE 3

| | Examples | | | Reference Examples | |
|---|---|---|---|---|---|
| | 1 | 2 | 3 | 1 | 2 |
| Activity per Ti (g) | 23200 | 22600 | 20300 | 19100 | 10800 |
| Acitivi per Catalyst (g) | 12600 | 10900 | 11900 | 12000 | 5600 |
| t-I.I. (%) | 98.1 | 98.2 | 98.0 | 98.0 | 95.4 |
| MFR (g/10 minutes) | 5.8 | 5.5 | 5.2 | 5.5 | 7.1 |
| Bulk Density (g/ml) | 0.45 | 0.45 | 0.45 | 0.45 | 0.43 |
| Melting Point (° C.) | 161.0 | 161.0 | 160.8 | 160.7 | 158.5 |
| Fine Polymer Powder (% by weight) | 0.0 | 0.1 | 0.5 | 2.1 | 10.3 |

In Table 3, t-I.I. represents a total isotactic index and is defined as below:

$$t-I.I. = \left\{ \left[ polymer\ powder\ (g) \times \left( \frac{extract\ residue\ by\ boiling\ hexane\ (\%)}{100} \right) \right] \Big/ [polymer\ powder\ (g) + solvent\ soluble\ polymer\ (g)] \right\} \times 100\ (\%)$$

The activity per Ti is the yield (g) of polypropylene per millimole of titanium of the solid titanium catalyst component (g-PP/mmol-Ti); the activity per catalyst is the yield (g) of polypropylene per gram of polymerization catalyst (g-PP/g-catalyst); and MFR means melt flow rate.

The fine polymer powder has a particle size of less than 100 nicronmeter.

Example 4
(Preparation of Solid Titanium Catalyst Component (A))

As shown in FIG. 2, 40 kg of diethoxymagnesium was placed in a one cubic meter capacity first reactor 1 together with 0.32 m³ of toluene to prepare a suspension. 80 liters of titanium tetrachloride was added to the suspension while the suspension was maintained at a temperature of 20° C. The suspension was then raised to a temperature of 85° C., and 11 liters of diisobutyl phthalate was added, followed by heating to a temperature of 110° C. and maintaining the suspension at the temperature for two h hours.

The suspension was sent to a first filter 2 under nitrogen pressure through a pipe A to separate a solid material. After the addition of a small amount of toluene to the solid material, it was filtrated. This operation was repeated five times. A small amount of toluene was added to the solid material thus obtained, and the solid material was sent to a one cubic meter capacity second reactor 3 under nitrogen pressure through a pipe B. 80 liters of titanium tetrachloride and 0.32 m³ of toluene were placed in the second reactor 3, and the mixture was heated to a temperature of 110° C. and maintained at the temperature for one hour. While these operations were carried out, the pipe A, the solid material in the pipe A, the first filter 2, the solid material in the first filter 2, the solid material in the first filter 2, the pipe B and the solid material in the pipe B were maintained at the temperature indicated in Table 4.

The resulting suspension prepared in the second reactor 3 was returned to the first filter 2 through a pipe B' where the suspension was filtrated to separate a solid material. A small amount of toluene was added to the solid material and the solid material was filtrated. This operation was repeated five times. After the addition of a small amount of toluene to the solid material, the solid material was then sent to the one cubic meter capacity second reactor 3 again under nitrogen pressure through the pipe B. In the same manner as mentioned hereinabove, 80 liters of titanium tetrachloride and 0.32 m³ of toluene were added to the second reactor 3, and the mixture was heated to a temperature of 110° C. followed by maintaining the mixture at the temperature for one hour. While these operations were carried out, the pipe B', the solid material in the pipe B', the first filter 2, the solid material in the first filter 2, the pipe B and the solid material in the pipe B were maintained at the temperature indicated in Table 4.

The suspension thus prepared in the second reactor 3 was sent to a second reactor 4 under nitrogen pressure through a pipe C where the suspension was filtrated to separate a solid material. After the addition of a small amount of hexane to the solid material, the solid material was then sent to a one cubic meter capacity washing apparatus 5. The solid material was washed three times each with 0.4 m³ of hexane at 60° C. and then further washed repeatedly with hexane at normal temperatures until no titanium was detected in the supernatant. After the washing in ths way, the solid material was sent to a drying apparatus 6 where the solid material was dried to provide a solid titanium catalyst component of the invention. The composition of the catalyst component is shown in Table 5.

(Polymerization of Propylene)

The polymerization of propylene was carried out in the same manner as in EXAMPLE 1 except that the above solid titanium catalyst component was used. The results of polymerization are shown in Table 6.

Reference Examples 3 and 4
(Preparation of Solid Titanium Catalyst Component (A))

The pipe A, the solid material in the pipe A, the first filter 2, the solid material in the first filter 2, the pipe B and solid material in the pipe B were maintained at the temperature indicated in Table 4, and otherwise in the same manner as in EXAMPLE 4, a solid titanium catalyst component was prepared. The composition of the catalyst component is shown in Table 5.

(Polymerization of Propylene)

The polymerization of propylene was carried out in the same manner as in EXAMPLE 1 except that the above solid titanium catalyst component was used. The results of polymerization are shown in Table 6.

TABLE 4

| | Temperatures (° C.) | | |
| --- | --- | --- | --- |
| | Example | Reference Examples | |
| | 4 | 3 | 4 |
| Pipe A | 90 | 65 | 115 |
| Solid Material in Pipe A | 90 | 60 | 115 |
| First Filter | 100 | 100 | 135 |
| Solid Material in First Filter | 100 | 100 | 135 |
| Pipe B and B' | 90 | 60 | 135 |
| Solid Material in Pipe B and B' | 90 | 60 | 135 |

TABLE 5

| | Component of Solid Titanium Catalyst Component (% by weight) | | |
| --- | --- | --- | --- |
| | Example | Reference Examples | |
| | 4 | 3 | 4 |
| Ti | 2.8 | 3.2 | 2.4 |
| Cl | 58 | 55 | 56 |
| Mg | 18 | 18 | 18 |
| DIBP[1] | 13.1 | 15.4 | 11.5 |
| OEH[2] | 0.0 | 0.0 | 0.0 |
| OEt[3] | 3.5 | 3.3 | 2.9 |

Notes:
[1] Diisobutyl phthalate
[2] Ethylhexoxyl group
[3] Ethoxyl group

TABLE 6

| | Example | Reference Examples | |
| --- | --- | --- | --- |
| | 4 | 3 | 4 |
| Activity per Ti (g) | 31800 | 27100 | 16400 |
| Acitivi per Catalyst (g) | 18600 | 18100 | 8200 |
| t-I.I. (%) | 96.8 | 96.7 | 95.8 |
| MFR (g/10 minutes) | 6.4 | 7.0 | 7.2 |
| Bulk Density (g/ml) | 0.38 | 0.36 | 0.35 |
| Melting Point (° C.) | 160.7 | 160.5 | 159.3 |
| Fine Polymer Powder (% by weight) | 2.5 | 3.9 | 4.4 |

Example 5
(Preparation of Solid Titanium Catalyst Component (A))

The atmosphere in a two cubic meter capacity high performance agitator was fully replaced with nitrogen. 70 liters of purified kerosene, 10 kg of commercially available magnesium chloride, 24.2 kg of ethanol and 3 kg of a surfactant, sorbitan distearate (Emasol 320 available from Kao Atlas K.K.), were placed in the agitator. The resulting mixture was heated to a temperature of 120° C. with stirring and was then stirred at a rate of 800 rpm at the temperature for 30 minutes, thereby providing a suspension which contained particles of complex of magnesium chloride and ethanol.

The suspension was transferred to a two cubic meter capacity reactor provided with a stirrer in which a cubic meter of purified kerosene kept at −10° C. had been placed with effective stirring through a polytetrafluoroethylene tube having an inside diameter of 5 mm to provide solid products. The solid product was fully washed with purified kerosene.

As shown in FIG. 2, 0.4 m³ of titanium tetrachloride and 20 kg of the solid product were placed in a one cubic meter capacity first reactor. The resulting mixture was heated to 120° C. in 2.5 hours. When the mixture reached a temperature of 100° C. in the course of the heating, 3.6 liters of diisobutyl phthalate was added to the mixture. The reaction mixture was maintained at 120° C. for 1.5 hours. The resulting suspension was sent to a first filter 2 from the first reactor 1 under nitrogen pressure through a first pipe A where the suspension was filtrated to separate the resulting solid material. A small amount of titanium tetrachloride was added to the solid material and was then sent to a one cubic meter capacity second reactor 3 under nitrogen pressure through a second pipe B. While these operations were carried out, the solid material in the first filter 2 as well as the first pipe A through which the suspension was sent to the first filter 2 from the first reactor 1 under pressure, the first filter 2 and the second pipe B were maintained at the temperature indicated in Table 7.

0.4 m³ of titanium tetrachloride was added to the second reactor 3, the mixture was then heated to 130° C. and maintained at the temperature for one hour. The resulting suspension was sent to a second filter 4 under nitrogen pressure through a pipe C where the suspension was filtrated to separate the resulting solid material. A small amount of hexane was added to the solid material and the mixture was supplied to a one cubicmeter capacity washing apparatus 5 through a pipe D. The solid material was washed three times each with 0.4 m³ of hexane at 60° C. and then further washed repeatedly with hexane at normal temperatures until no titanium was detected in the supernatant. After the washing in ths way, the solid material was sent to a drying apparatus 6 through a pipe E where the solid material was dried to provide a solid titanium catalyst component of the invention. The composition of the catalyst component is shown in Table 8.

(Polymerization of Propylene)

The polymerization of propylene was carried out in the same manner as in EXAMPLE 1 except that the above solid titanium catalyst component was used. The results of polymerization are shown in Table 9.

TABLE 7

|  | Temperatures (° C.) | |
| --- | --- | --- |
|  | Example 5 | Reference 5 |
| Pipe A | 90 | 60 |
| Solid Material in Pipe A | 90 | 60 |
| First Filter | 100 | 100 |
| Solid Material in First Filter | 100 | 100 |
| Pipe B | 90 | 60 |
| Solid Material in Pipe B | 90 | 60 |

TABLE 8

| | Component of Solid Titanium Catalyst Component (% by weight) | |
| --- | --- | --- |
|  | Example 5 | Reference Example 5 |
| Ti | 2.3 | 2.6 |
| Cl | 650 | 650 |
| Mg | 210 | 210 |
| DIBP[1)] | 4.6 | 5.4 |
| OEH[2)] | 0.0 | 0.0 |

Notes:
[1)]Diisobutyl phthalate
[2)]Ethylhexoxyl group

TABLE 9

|  | Example 5 | Reference Example 5 |
| --- | --- | --- |
| Activity per Ti (g) | 26600 | 21900 |
| Acitivi per Catalyst (g) | 12800 | 11900 |
| t-I.I. (%) | 97.6 | 97.5 |
| MFR (g/10 minutes) | 6.1 | 6.3 |
| Bulk Density (g/ml) | 0.46 | 0.45 |
| Melting Point (° C.) | 160.7 | 160.5 |
| Fine Polymer Powder (% by weight) | 0.0 | 1.2 |

What is claimed is:

1. A process for the preparation of a solid titanium catalyst component which comprises:
   (1) a step wherein a suspension is prepared which contains a solid material prepared by contacting a magnesium compound with titanium tetrachloride and having a polybasic carboxylic acid ester supported on said solid material, wherein said titanium tetrachloride is used in an amount of 0.01–1000 mole parts per mole part of the magnesium compound used and said polybasic carboxylic acid ester is used in an amount of 0.01–5 mole parts per mole part of the magnesium compound used;
   (2) a step wherein the solid material is separated from the suspension; and
   (3) a step wherein the solid material is contacted with titanium tetrachloride under heating wherein said titanium tetrachloride is used in an amount of 5–200 mole parts per mole part of the magnesium compound used;
   wherein while the solid material is separated from the suspension in the step (2) and the solid material is supplied to the step (3), the solid material is maintained at a temperature in the range of 70–130° C., said temperature being maintained in said range from the end of step 1 to the beginning of step 3; and
   wherein said titanium tetrachloride is liquid at normal temperature;
   said magnesium compound is selected from the group consisting of magnesium chloride and diethoxymagnesium; and
   said polybasic carboxylic acid ester is a phthalic acid dialkyl ester wherein each of the alkyls have 1–20 carbons and the alkyls may be the same or different from each other.

2. A process as claimed in claim 1 wherein the magnesium compound is dissolved in a solvent which is a solubilizing agent.

3. A process as claimed in claim 2 wherein the solubilizing agent is an aliphatic alcohol of not less than 6 carbons.

4. A process as claimed in claim 1 wherein the magnesium compound is dissolved in a hydrocarbon solvent in the presence of an aliphatic alcohol of not less than 6 carbons as a solubilizing agent.

5. A process as claimed in claim 2, 3 or 4 wherein the magnesium compound is contacted with titanium tetrachloride in the presence of an electron donor wherein:
   the electron donor is at least one of organic carboxylic acid esters, aliphatic carboxylic acids, acid anhydrides, ketones, ethers, aliphatic carbonates, silane compounds or organophosphorus compounds.

6. A process as claimed in claim 1 wherein the polybasic carboxylic acid ester is dialkyl phthalate.

7. A solid titanium catalyst component prepared by a process as claimed in claim 1.

8. An olefin polymerization catalyst which comprises:
   (A) the solid titanium catalyst component prepared by a process as claimed in claims 1;
   (B) an organometallic compound; and
   (C) a silane compound having Si—O—C bond in the molecule.

9. An olefin polymerization catalyst as claimed in claim 8 therein the silane compound has the formula of

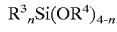

wherein $R^3$ and $R^4$ are independently monovalent hydrocarbon groups of 1–20 carbons; and n is an integer of 1–3.

10. A preliminary olefin polymerization catalyst which is prepared by preliminarily polymerizing an olefin or copolymerizing two or more olefins in the presence of catalyst components comprising:

(A) the solid titanium catalyst component prepared by a process as claimed in claim 1; and (B) an organometallic compound; and optionally (C) a silane compound having Si—O—C bond in the molecule.

11. A preliminary olefin polymerization catalyst as claimed in claim 10 wherein the silane compound has the formula of $$R^3{}_n Si(OR^4)_{4-n}$$

wherein $R^3$ and $R^4$ are independently monovalent hydrocarbon groups of 1–20 carbons; and n is an integer of 1–3.

12. A process for polymerizing olefins in the presence of the olefin polymerization catalyst as claimed in claim 8 or 9.

13. A process for polymerizing olefins in the presence of the olefin polymerization catalyst which comprises the preliminary olefin polymerization catalyst as claimed in claim 10 or 11.

14. A process as claimed in claim 1, wherein the polybasic carboxylic acid is dibutyl phthalate.

* * * * *